United States Patent [19]

Okonogi et al.

[11] Patent Number: 4,632,832

[45] Date of Patent: Dec. 30, 1986

[54] INSTANT CREAMING POWDER

[75] Inventors: Shigeo Okonogi, Tokyo; Kunisuke Kuwahara, Yokohama; Mamoru Tomita, Yokohama; Tsutomu Kudo, Yokohama; Takashi Suzuki; Toshio Tomimura, both of Chiba; Kaichiro Takahashi, Kawagoe; Tomokazu Obayashi, Tokyo, all of Japan

[73] Assignee: Morinaga Milk Industry Co., Ltd., Tokyo, Japan

[21] Appl. No.: 765,786

[22] Filed: Aug. 15, 1985

[30] Foreign Application Priority Data

Aug. 15, 1984 [JP] Japan .................... 59-169296

[51] Int. Cl.$^4$ ............................... A23L 1/19
[52] U.S. Cl. ........................ 426/96; 426/98; 426/613; 426/586; 426/588; 426/658; 426/250; 426/540
[58] Field of Search .............. 426/613, 98, 96, 586, 426/588, 658, 250, 540

[56] References Cited

U.S. PATENT DOCUMENTS

| | | | |
|---|---|---|---|
| 4,045,589 | 8/1977 | Petrowshi et al. | 426/98 |
| 4,046,926 | 9/1977 | Gardiner | 426/613 |
| 4,239,786 | 12/1980 | Gilmore | 426/613 |
| 4,242,364 | 12/1980 | Buddemeyer et al. | 426/613 |
| 4,460,617 | 7/1984 | Barndt et al. | 426/98 |
| 4,492,714 | 1/1985 | Cooper et al. | 426/98 |

*Primary Examiner*—Jeanette Hunter
*Attorney, Agent, or Firm*—Sughrue, Mion, Zinn, Macpeak & Seas

[57] ABSTRACT

This invention relates to instant creaming powder enriched with flavor and/or color which contains at least 0.2% by weight of fine particles prepared by locking a small amount of flavor in a mixture of a saccharide dehydrate and a saccharide, or coloring the mixture, or subjecting the mixture to both of these treatments, to obtain suitable solubility, creaminess and whitening effect equal to those of the conventional instant creaming powder in spite of incorporating thereinto the fine particles for enrichment with flavor, and has a novel appearance in which fine particles having crystalline brilliance are uniformly dispersed in the instant creaming powder.

8 Claims, No Drawings

INSTANT CREAMING POWDER

BACKGROUND OF THE INVENTION

1. Industrial Field of the Invention

This invention relates to instant creaming powder enriched with flavor and/or color. More particularly, it relates to instant creaming powder enriched with flavor and/or color which contains at least 0.2% by weight of fine particles prepared by locking a small amount of flavor in a mixture of a saccharide hydrolyzate and a saccharide in a ratio of 1:1, or coloring the mixture, or subjecting the mixture to both of these treatments.

2. Background of the Art and Related Art

In Japan, instant creaming powder is one of typical powdered foods. The commercially available instant creaming powders are those which are left spray-dried and those produced by a so-called granulation treatment comprising adding water to fine powder after spray drying and then drying the resulting mixture again. Thus, although the commercially available products differ in whether they are subjected to the granuration treatment or not, all of them consist of a homogeneous composition having a milk-like appearance. Therefore, there have hetofore been neither products produced by mixing instant creaming powder with other materials such as fine particles to obtain an heterogeneous system nor commodities increased in added value by addition of other materials, and there is no finding about such products or prior arts.

In order to promote consumers' interest in instant creaming powder and desire to it at the same time, the present inventors have conducted various researches, and have consequently found that preferable properties can be added to instant creaming powder by mixing, in a definite ratio, instant creaming powder with at least 0.2% by weight of fine particles having a predetermined particle size which comprises a mixture of a saccharide hydrolyzate and a saccharide in a ratio of about 1:1 and have been subjected to lock therein of a small amount of a flavoring material, or coloring, or both of these treatments, said mixture being able to be incorporated, if necessary, with a seasoning material.

OBJECTS OF THE INVENTION AND SUMMARY OF THE INVENTION

An object of this invention is to provide instant creaming powder which emits a preferable flavor on addition to coffee.

Another object of this invention is to provide instant creaming powder which has properties such as solubility, creaminess and white turbidity equal to those of the conventional instant creaming powders in spite of incorporating thereinto the fine particles for enrichment with flavor, and has a novel appearance in which fine particles having crystalline brilliance are uniformly dispersed in the instant creaming powder.

This invention is instant creaming powder enriched with flavor and/or color which is characterized by comprising at least 0.2% by weight of fine particles composed of mixture of a saccharide hydrolyzate and a saccharide containing a flavoring material and/or a coloring material, and instant creaming powder.

DETAILED EXPLANATION OF THE INVENTION

The fine particles incorporated into the instant creaming powder enriched with flavor and/or color of this invention comprises a mixture of a saccharide hydrolyzate and a saccharide which contain a flavoring material and/or coloring material and if necessary, may contain a seasoning material. The particle size of the fine particles is 15 to 300 mesh and is adjusted so that the average particle size thereof is 0.3 of 3 times, preferably 0.5 to 2 times that of the starting instant creaming powder particles. The saccharide hydrolyzate and saccharide in the fine particles can be mixed in any ratio so long as they interfere with neither the incorporation of a flavoring material and/or a coloring material nor dissolution of the fine particles to the same degree as the starting instant creaming powder, but it is generally preferable that the saccharide hydrolyzate and the saccharide are mixed in a ratio of about 1:1 by weight.

As the saccharide hydrolyzate in the fine particles, a hydrolyzate of any saccharide can be used so long as it neither interferes with the incorporation of a flavoring material and/or a coloring material nor lowers the solubility of the fine particles, but it is preferable to use a starch hydrolyzate, a lactose hydrolyzate, cyclodextrin or a mixture thereof. As the saccharide, any saccharide can be used so long as it neither interferes with the incorporation of a flavoring material and/or a coloring material nor lowers the solubility of the fine particles, but it is preferable to use glucose, fructose, galactose, lactose, sucrose, maltose, an isomerized saccharide or a mixture thereof.

The fine particles in the instant creaming powder enriched with flavor/or color of this invention are produced in the following manner by the process disclosed in the U.S. Pat. No. 2,809,895.

A mixture of the saccharide hydrolyzate and the saccharide is dissolved in warm water or hot water, followed by adding thereto a small amount of a coloring material and if necessary, a small amount of a seasoning material. While maintaining the temperature of the resulting solution at 100° to 120° C., its water content is adjusted to 3 to 6% by weight. While vigorously stirring the solution in an airtight vessel with caution so as not to cause contamination with air, a flavoring material is added, and if necessary, a small amount of an emulsifier is added to make the flavoring material into fine particles, whereby the flavoring material is uniformly dispersed into the solution. After sufficient emulsification is conducted, the resulting emulsion is extruded through a screen of definite mesh into filaments by spontaneous dropping or by pressurization, and the filaments are placed in a previously cooled organic solvent such as ethanol or the like to be solidified and cooled. After being sufficiently cooled, the filamentary solid is ground by a suitable means. The ground solid is taken out of the organic solvent, sufficiently vacuum-dried, and then adjusted to a desired particle size by filtration to obtain fine particles having crystalline brilliance. The saccharide hydrolyzate and saccharide used for preparing the aforesaid fine particles are properly selected in consideration of an adjustment of the particle size of the fine particles and their moisture absorptivity, solubility and flavor, and in particular, it is preferable to use a starch hydrolyzate having a DE (dextrose equivalent) of 3 or more and sucrose.

As the flavoring material contained in the fine particles, any water-soluble or oil-soluble flavoring material can be used so long as it is edible, but when an oil-soluble flavoring material is used, it is preferable to add, if necessary, an emulsifier such as lecithin or the like in order to conduct sufficient emulsification. As the flavoring material, there is preferably used a butter flavor, a cream flavor, a milk flavor, a vanilla flavor or the like. Although the flavoring material can be used in any amount according to the need, it is preferably used in such an amount that it is contained in the fine particles in an amount of 0.1 to 2% by weight.

As the coloring material contained in the fine particles, any water-soluble or oil-soluble coloring material can be used so long as it is edible, but for uniformly coloring to the fine particles, it is preferable to use a water-soluble coloring material. The kind and intensity of the color tone can be optionally selected, but in view of application to instant creaming powder, it is preferable that a yellowish tone is used as basic tone and that the coloring material is used in such an amount that no sense of incompatibility is imparted to the final product. For example, gardenia pigment is preferably used in such an amount that it is contained in the fine particles in an amount of 0.5 to 2.5% by weight.

As the seasoning material added, if necessary, to the fine particles, any one may be used so long as it is edible, but the seasoning material is preferably selected from the group consisting of seasoning materials effective for improving coffee flavor such as nucleic acid-related compounds, amino acid-related compounds and protein hydrolyzate. Although the amount of the seasoning material used depends on the intensity of seasoning and the compatibility with coffee, the nucleic acid-related compounds are preferably used in such an amount that they are contained in the fine particles in an amount of 0.01 to 0.5% by weight.

As the starting instant creaming powder, there can be used any of natural, semisynthetic or synthetic instant creaming powders prepared by a conventional process by using, as main constituent, fresh cream, a mixture of fresh cream and animal fats or vegetable fats and oil, animal or vegetable fats and oils, or a mixture of animal fats or vegerable fats and oils.

In producing a final product by mixing the fine particles with the starting instant creaming powder, the ratio of the particle size of the fine particles to the average particle size of the starting instant creaming powder and the adding proportion of the fine particles are important. That is to say, when either of them is too low, there are not sensuously perceived crystalline brilliance due to the presence of the fine particles and/or enhanced flavor. On the other hand, when either of them is too high, sufficient crystalline brilliance can be obtained but the appearance intrinsic to the starting instant creaming powder is lost. Moreover, when the final product is dissolved in coffee, the flavor intrinsic to the starting instant creaming powder is spoiled, and at the time of stirring with a spoon, the end of the spoon tends to be felt to be caught by a part of the fine particles which are lowered the others in solubility. Therefore, the final product becomes undesirable as a commodity.

As a result of various researches, it has been experimentally found that the particle size of the fine particles is preferably in the range of 0.3 to 3 times, particularly preferably 0.5 to 2 times the average particle size of the starting instant creaming powder, and that the fine particle content is preferably in the range of 0.2 to 10% by weight, particularly preferably 1 to 5% by weight.

This invention is described below in detail with reference to test examples.

TEST 1

This test was carried out to investigate the particle size of the fine particles added to instant creaming powder.

(1) Preparation of Samples

To 3 kg of boiling water were added 1 kg of a commercially available starch hydrolyzate (DE:5) obtained by amylase treatment and 1 kg of sucrose, and dissolved therein by mixing, after which a solution prepared by dissolving a commercially available yellow natural coloring material (gardenia) and 10 g of a soybean protein hydrolyzate in a small amount of water was added. Subsequently, the resulting solution was heated to 120° C. and boiled down until its water content became 3 to 6% by weight. On the other hand, a mixture of 10 g of a commercially available oil-soluble natural cream flavor, 0.4 g of soybean lecithin and 0.2 g of vitamin E was gradually added to the above-mentioned saccharide mixed solution with vigorous, and the stirring was continued for another 1 to 2 minutes to conduct emulsification. After the emulsification, the resulting emulsion was extruded through a screen into filaments, which were then placed in previously cooled dehydrated ethanol to be cooled and solidified. The sufficiently cooled filamentary solid was ground and then centrifuged to separate ethanol. Next, the residue was dried by means of a racuum rotary dryer to be sufficiently free from ethanol and then shifted. This preparation procedure was repeated to obtain fine particles of various particle sizes from 5 to 200 mesh. With 0.3 g of the fine particles of various particle sizes obtained was mixed 9.7 kg of instant creaming powder with an average particle size of 40 mesh prepared by a conventional process.

(2) Test Method

Each sample was organoleptically estimated by test panelers consisting of five men and five women according to the following criterion:

4 marks: A proper amount of yellow, crystalline, fine particles were observed, the balance of flavor and color tone is very good, and no impression of foreign matter is given.

3 marks: Yellow, crystalline, fine particles are observed, the balance of flavor and color tone is good, and no impression of foreign matter is given.

2 marks: A small amount of yellow, crystalline, fine particles are observed, the balance of flavor and color tone is good, and no impression of foreign matter is given.

1 mark: A very small amount of yellow, crystalline, fine particles are observed, but a sense of incompatibility is slightly felt.

0 mark: Crystalline fine particles are scarcely observed, or an impression of foreign matter is given by fine particles.

(3) Test Results

The results of the test after arrangement are shown in Table 1.

TABLE 1

In the case where the average particle size of instant creaming powder is 40 mesh

| Particle size of fine particle (mesh) | Ratio of particle size | Number of paneler | | | | | | | | | | Average |
|---|---|---|---|---|---|---|---|---|---|---|---|---|
| | | 1 | 2 | 3 | 4 | 5 | 6 | 7 | 8 | 9 | 10 | |
| 12 | 0.3 | 1 | 0 | 0 | 0 | 1 | 0 | 1 | 1 | 0 | 0 | 0.4 |
| 12–20 | 0.3–0.5 | 1 | 1 | 1 | 0 | 2 | 1 | 1 | 2 | 1 | 1 | 1.1 |
| 20–30 | 0.5–0.75 | 3 | 3 | 2 | 2 | 3 | 3 | 2 | 3 | 2 | 2 | 2.5 |
| 30–60 | 0.75–1.5 | 4 | 4 | 3 | 4 | 3 | 4 | 4 | 4 | 3 | 4 | 3.7 |
| 60–80 | 1.5–2.0 | 3 | 4 | 4 | 4 | 4 | 4 | 3 | 4 | 3 | 4 | 3.7 |
| 80–100 | 2.0–2.5 | 1 | 2 | 3 | 2 | 2 | 2 | 2 | 2 | 1 | 2 | 1.9 |
| 100–120 | 2.5–3.0 | 1 | 2 | 2 | 2 | 1 | 2 | 1 | 1 | 2 | 1 | 1.5 |
| 120 | 3.0 | 0 | 1 | 1 | 1 | 0 | 1 | 0 | 0 | 1 | 0 | 0.5 |

Note:
Ratio of particle size is the ratio of the particle size of each fine particle to the average particle size of instant creaming powder.

From the results in Table 1, it is evident that there is a close relation between the ratio of the particle size of the fine particles to the average particle size of the starting instant creaming powder and the balance of flavor and color tone of the final product. That is to say, when the ratio of the particle size of the fine particles to the average particle size of the starting instant creaming powder was as too low as below 0.3, it became difficult to observe crystalline fine particles in the resulting instant creaming powder composition. On the other hand, when said ratio was as too high as above 3.0, the fine particles in the resulting instant creaming powder composition became to given an impression of foreign matter. From the results described above, it has been found that when the particle size of the fine particles is adjusted to 0.3 to 3 times, particularly 0.5 to 2 times as much as the average particle size of the starting instant creaming powder, crystalline fine particles are observed in the resulting instant creaming powder composition, which the balance of flavor and color tone is good, and the fine particles give no impression of foreign matter.

On the other hand, the average particle size of instant creaming powder produced by a conventional process usually ranges from 30 to 100 mesh, therefore from the results shown in Table 1, the range of the size of the fine particles in relation to the average particle size of the starting instant creaming powder is concluded to be from 9 mesh (30×0.3) to 300 mesh (100×3.0), particularly preferably from 15 mesh (30×0.5) to 200 mesh (100×2.0).

In this respect, a confirmation test was elicited also for instant creaming powder having a different average particle size by the same method as in Test 1.

TEST 2

This test was carried out as to the amount of the fine particles added to instant creaming powder.

(1) Preparation of Samples

Fine particles with a particle size in the range from 30 to 60 mesh prepared by the same process as in Test 1 were mixed with instant creaming powder with an average particle size of 75 mesh produced by a conventional process, so that the fine particle content was 0.1%, 0.2%, 0.5%, 1%, 5%, 8%, 10% or 12%, whereby samples were obtained.

(2) Test Method

Each sample was organoleptically estimated by test panelers consisting of five men and five women according to the following criterion:

4 marks: A moderate amount of yellow, crystalline, fine particles are observed, the balance of flavor and color tone is very good, and no impression of foreign matter is given.

3 marks: Yellow, crystalline, fine particles are observed, the balance of flavor and color tone is good, and no impression of foreign matter is given.

2 marks: A small amount of yellow, crystalline, fine particles are observed, the balance of flavor and color tone is relatively good, and no impression of foreign matter is given.

1 mark: A very small or considerable amount of yellow, crystalline, fine particles are observed, but the balance of flavor and color tone causes a slight sence of incomapatibility.

0 mark: Yellow, crystalline, fine particles are scarcely observed, or observed in so large an amount that they give an impression of foreign matter, and flavor is too strong.

TABLE 2

In the case where the average particle size of instant creaming powder is 75 mesh

| Fine particle content (%) | Number of paneler | | | | | | | | | | Average |
|---|---|---|---|---|---|---|---|---|---|---|---|
| | 1 | 2 | 3 | 4 | 5 | 6 | 7 | 8 | 9 | 10 | |
| 0.1 | 0 | 1 | 0 | 0 | 0 | 1 | 0 | 0 | 0 | 0 | 0.2 |
| 0.2 | 1 | 2 | 1 | 1 | 1 | 2 | 1 | 1 | 1 | 1 | 1.2 |
| 0.5 | 2 | 2 | 1 | 2 | 1 | 3 | 1 | 1 | 2 | 1 | 1.6 |
| 1 | 4 | 3 | 3 | 3 | 2 | 3 | 2 | 2 | 3 | 2 | 2.7 |
| 3 | 4 | 4 | 3 | 3 | 4 | 4 | 4 | 4 | 4 | 4 | 3.8 |
| 5 | 3 | 3 | 3 | 3 | 3 | 3 | 2 | 3 | 3 | 3 | 2.9 |
| 8 | 2 | 2 | 1 | 2 | 3 | 1 | 1 | 1 | 2 | 1 | 1.6 |
| 10 | 1 | 1 | 1 | 1 | 2 | 1 | 1 | 1 | 2 | 1 | 1.2 |
| 12 | 0 | 0 | 1 | 1 | 0 | 1 | 0 | 1 | 0 | 1 | 0.5 |

From the results shown in Table 2, it has been found that the fine particle content of the sample is important for adjusting the balance of flavor and color tone. That is to say, the sample having a fine particle content of less than 0.2% by weight had no crystalline brilliance and was not different from conventional instant creaming powder in appearance and flavor. On the other hand, the sample having a fine particle content of more than 10% by weight had too strong a brilliance, resulting in injury to the appearance intrinsic to the starting instant creaming powder, and had a flavor stronger than is needed, so that it became undesirable as a commodity.

Therefore, the fine particle content was found to be preferably in the range of 0.2 to 10% by weight, particularly preferably 1 to 5% by weight. A test was carried out for various average particle sizes of instant creaming powder to obtain substantially the same results.

EXAMPLE 1

In 3 kg of boiling water were dissolved 1 kg of a commercially available starch hydrolyzate (DE:5) obtained by amylase treatment and 1 kg of sugar, after which a solution prepared by dissolving 10 g of a commercially available natural coloring material (gardenia) and 1 g of a commercially available milk protein hydrolyzate as a seasoning material in a small amount of water was added. Subsequently, the resulting solution was heated to 120° C. and boiled down until its water content became 6%.

On the other hand, 10 g of a commercially available oil-soluble natural cream flavor, 0.4 g of soybean lecithin and 0.2 g of vitamine E were mixed, and the mixture was gradually added to the above-metioned saccharide mixed solution with vigorous stirring, after which the resulting mixture was stirred for 2 minutes to conduct dispersion and emulsification.

After the emulsification, the resulting emulsion was extruded through a 20 mesh screen into filaments, which were then placed in previously cooled dehydrated ethanol to be cooled and solidified. The sufficiently cooled filamentary solid was ground and then centrifuged to separate ethanol. Next, the residue was placed in a vacuum rotary dryer, dried at a heating temperature of 35° C. and a vacuum of 30 Torr for 5 hours to be sufficiently free from ethanol, and then shifted so that the particle size ranged from 30 to 60 mesh, whereby about 1.7 kg of yellow fine particles were obtained.

With 1 kg of the yellow fine particles was mixed 32.3 kg of instant creaming powder having an average particle size of 60 mesh prepared by a conventional method to obtain about 33.3 kg of instant creaming powder enriched with flavor and the like which had a novel appearance and, on addition to coffee, could impart a favorable flavor without deterioration of the immediate slubility, creaminess, whitening effect and the like in coffee.

When a brown glass bottle was packed with this product and tightly sotppered with a cap having inner seal, after which the product was stored at 30° C. for 6 months, neither the color tone nor the flavor changed.

EXAMPLE 2

In 3 kg boiling water were dissolved 0.8 kg of a commercially available starch hydrolyzate (DE:10) obtained by acid treatment, 0.6 kg of a lactose hydrolyzate (hydrolyzation ratio:65%) obtained by enzmic treatment with lactase and 0.6 kg of commercially available maltose, and a solution prepared by dissolving 2 g of a mixture of equivalent amounts of commercially available inosinic acid and guanylic acid in a small amount of water was added as a seasoning material. Subsequently, the resulting solution was heated to 115° C. and boiled down until its water content became 4% by weight. A commercially available water-sluble cream flavor was gradually added to this saccharide mixed solution with vigorous stirring, and the resulting mixture was stirred for 2 minutes to conduct dispersion and mixing.

Next, this mixture was extruded through a 20 mesh screen into filaments, which were then placed in previously cooled dehydrated ethanol to be cooled and solidified. The sufficiently cooled filamentary solid was ground and then centrifuged to separate ethanol, after which 40 g of lactose was added to the residue, and they are homogeneously mixed. Then, the resulting mixture was placed in a vacuum rotary dryer, dried at a heating temperature of 30° C. and a vacuum of 50 Torr for 7 hours to be sufficiently free from ethanol, and then shifted so that the particle size ranged from 20 to 80 mesh, whereby about 1.9 kg of fine particles were obtained. With 1 kg of the fine particles was mixed 49 kg of instant creaming powder having an average particle sie of 75 mesh prepared by a conventional method to obtain about 50 kg of instant creaming powder enriched with flavor and the like which had a novel appearance and, on addition to coffee, could impart favorable flavor and taste without deterioration of the immediate solubility, creaminess, whitening effect and the like in coffee. When a brown glass bottle was packed with this product and thightly stoppered with a cap having an inner seal, after which the product was stored at 30° C. for 6 months, neither the color tone nor the flavor changed.

EFFECTS OF THE INVENTION

Effects brought about by this invention are as follows.

1. Effect on the appearance of the final product: By virtue of addition of the fine particles, the final product has favorable crystalline brilliance and can bring about a visually advantageous effect as compared with conventional creaming powder. Further, when a coloring material, for example, a yellowish coloring material is added to the fine particles to make creamy color, the colored fine particles show creaminess and hence have a particularly advantageous effect.

2. Effect on retention of flavor: Since the flavor is confined in the fine particles comprising a saccharide as the main constituent, it is stably retained with almost no diffusion even in vacuo. Therefore, when incorporated with the fine particles, instant creaming powder which is stored for a relatively long period of time from its production to use can retain the same flavor as immediately after the production till the use without dispersion. The incorporation with the fine particles is advantageous not only in that the flavor is not dispersed, but also in that since the interior of the fine particles is isolated from the atmosphere, the flavor is hardly changed or deteriorated by oxidation or the like.

3. Improving effect on the flavor of coffee: Since the fine particles are immediately soluble, the confined flavor and the seasoning material are disperesed and dissolved in coffee in an instant, so that a fresh flavor can be emited without spoiling the flavor intrinsic to coffee and that a good taste also can be imparted.

What is claimed is:

1. An instant creaming powder enriched with flavor and/or color comprising:
    (1) instant creaming powder, and
    (2) at least 0.2 to 10 percent by weight of a mixture of fine particles having a particle size of 0.3 to 3 times the average particle size of said instant creaming powder (1), said mixture of said fine particles comprising a saccharide hydrolyzate and a saccharide-containing flavoring and/or coloring material.

2. Instant creaming powder enriched with flavor and/or color according to claim 1, wherein the saccharide hydrolyzate and the saccharide are present in a ratio of about 1:1 by weight.

3. Instant creaming powder enriched with flavor and/or color according to claim 1, wherein the fine particle is in the range of 1 to 5 percent by weight.

4. Instant creaming powder enriched with flavor and/or color according to any one of claims 1 to 3, wherein the size of the fine particles is 0.5 to 2 times the average particle size of the instant creaming powder.

5. Instant creaming powder enriched with flavor and/or color according to claim 1, wherein the size of the fine particles is in the range of 9 to 300 mesh.

6. Instant creaming powder enriched with flavor and/or color according to claim 1, wherein the saccharide hydrolyzate is selected from the group consisting of starch hydrolyzate, lactose hydrolyzate, cyclodextrin and mixtures thereof.

7. Instant creaming powder enriched with flavor and/or color according to claim 1, wherein the saccharide is selected from the group consisting of glucose, fructose, sucrose, maltose, isomerized saccharides and mixtures thereof.

8. Instant creaming powder according to claim 1, wherein said instant creaming powder (1) comprises natural, semisynthetic or synthetic instant creaming powders using as main constituents: fresh cream, a mixture of fresh cream and animal fats or vegatable fats and oil, animal or vegetable fats and oils, or a mixture of animal fats or vegetable fats and oils.

* * * * *